United States Patent
Kim et al.

(10) Patent No.: US 8,675,723 B2
(45) Date of Patent: Mar. 18, 2014

(54) APPARATUS AND METHODS FOR PROCESSING A VESTIGIAL SIDEBAND SIGNAL USING A SECTIONALIZING ADAPTIVE EQUALIZER

(75) Inventors: DoHan Kim, Suwon-si (KR); Beom kon Kim, Seoul (KR); Sergey Zhidkov, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 200 days.

(21) Appl. No.: 13/027,710

(22) Filed: Feb. 15, 2011

(65) Prior Publication Data

US 2011/0243212 A1    Oct. 6, 2011

(30) Foreign Application Priority Data

Apr. 5, 2010  (KR) .................. 10-2010-0031067

(51) Int. Cl.
*H04L 27/01* (2006.01)
(52) U.S. Cl.
USPC .......................................... 375/232; 375/229
(58) Field of Classification Search
USPC .................................. 375/232, 229
See application file for complete search history.

(56) References Cited

U.S. PATENT DOCUMENTS

| 4,774,716 A * | 9/1988 | Hagmann ............... 375/329 |
| 7,346,104 B2 | 3/2008 | Yu et al. |
| 2002/0186763 A1* | 12/2002 | Kennedy et al. ......... 375/232 |
| 2003/0212947 A1* | 11/2003 | Schenk et al. .......... 714/786 |
| 2005/0002465 A1* | 1/2005 | Jeong ................... 375/261 |
| 2005/0259767 A1* | 11/2005 | Garmany et al. ........ 375/343 |
| 2008/0205503 A1 | 8/2008 | Cooke et al. |

FOREIGN PATENT DOCUMENTS

KR      1020060012780      2/2006

OTHER PUBLICATIONS

Jong Young Han et al., "An Adaptive Linear Channel Equalizer Using Asymmetric Transversal Filter", KICS, '05-8 vol. 30, No. 9A; 2005 NuriMedia Col, Ltd.—Abstract in English.

* cited by examiner

*Primary Examiner* — Michael Neff
(74) *Attorney, Agent, or Firm* — Myers Bigel Sibley & Sajovec, P.A.

(57) ABSTRACT

A symbol sequence corresponding to a vestigial sideband (VSB) signal is divided into a plurality of sections, respective ones of which correspond to respective time periods. Individual ones of the sections are recursively adaptively equalized to produce respective equalized sections. A bit stream is constructed from the equalized sections.

19 Claims, 11 Drawing Sheets

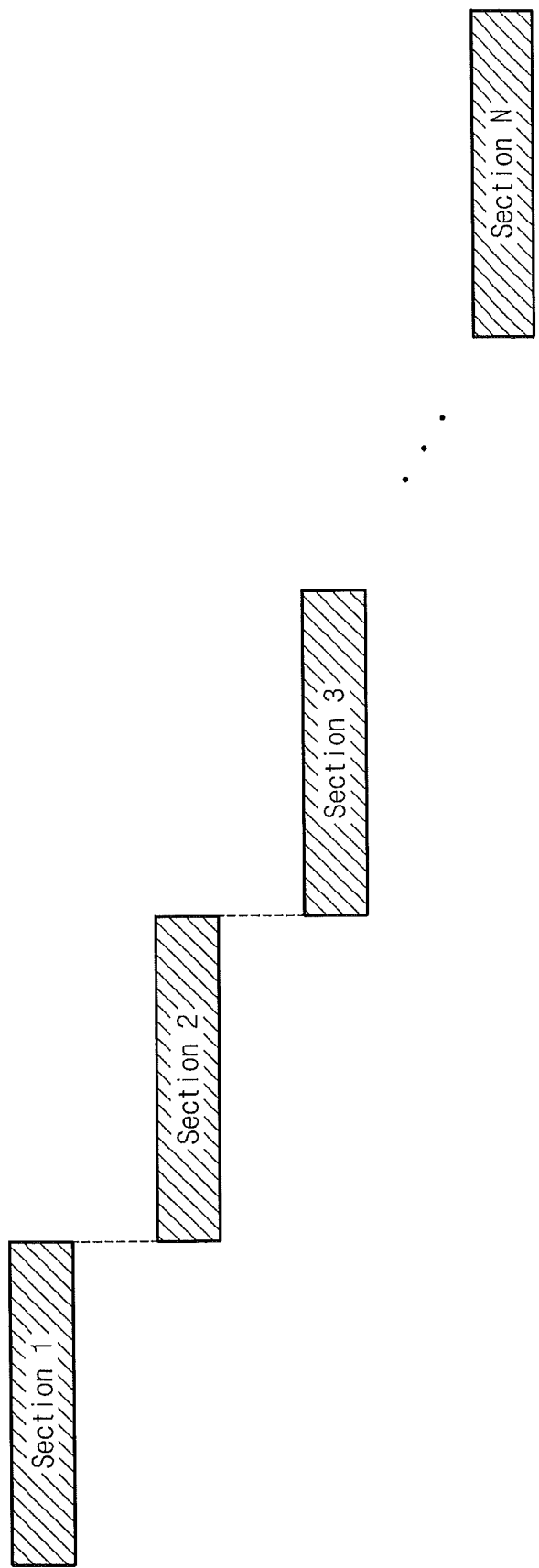

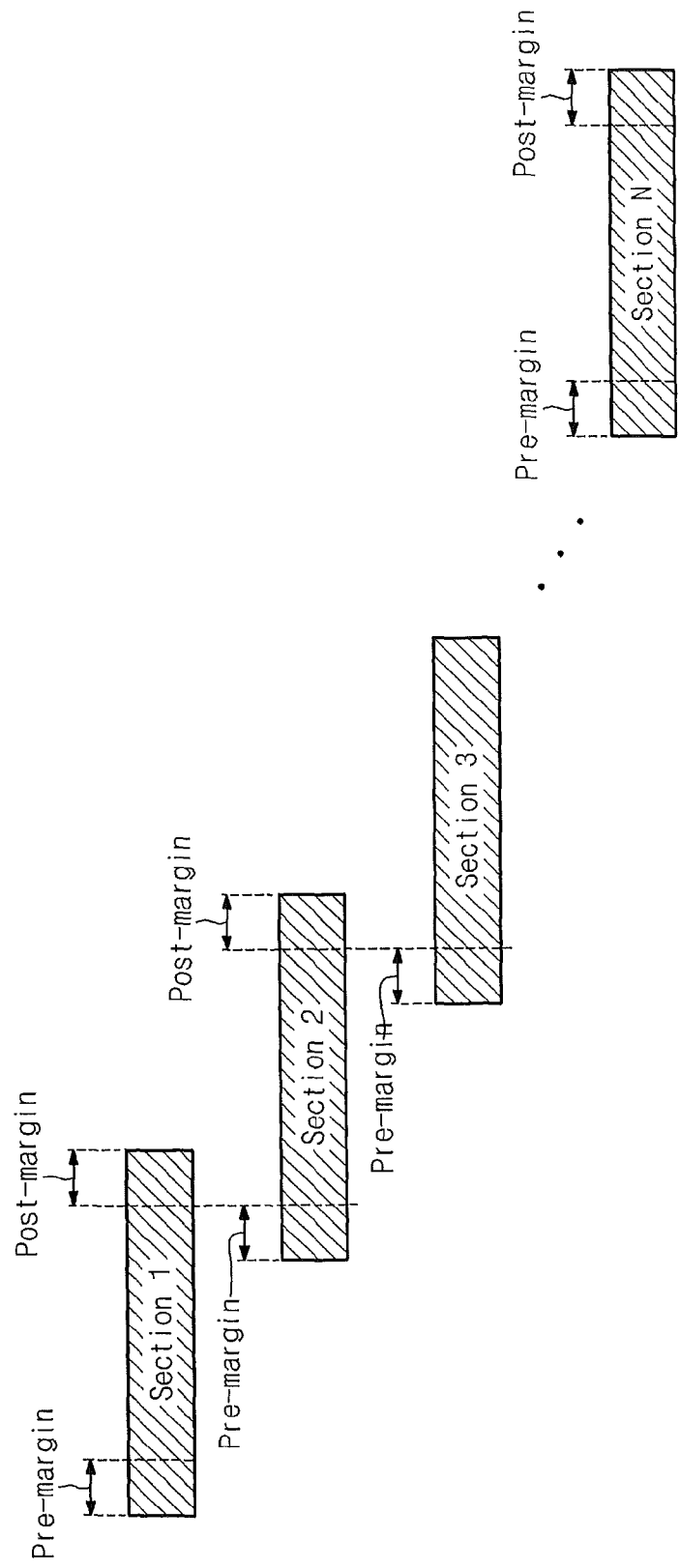

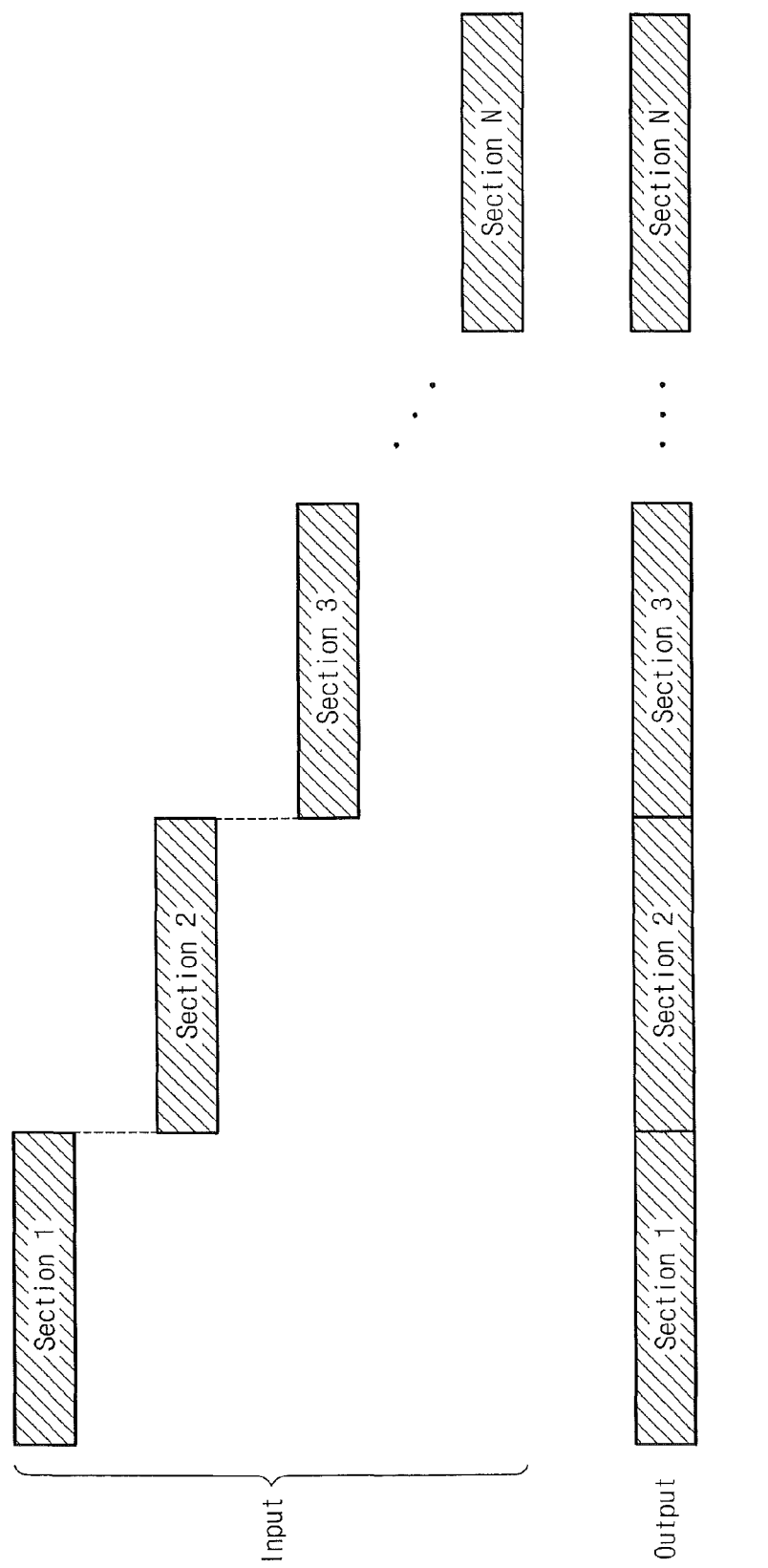

APPARATUS AND METHODS FOR PROCESSING A VESTIGIAL SIDEBAND SIGNAL USING A SECTIONALIZING ADAPTIVE EQUALIZER

CROSS-REFERENCE TO RELATED APPLICATIONS

This U.S. non-provisional patent application claims priority under 35 U.S.C. §119 of Korean Patent Application No. 10-2010-0031067, filed on Apr. 5, 2010, the entire contents of which are hereby incorporated by reference.

BACKGROUND OF THE INVENTION

The inventive subject matter relates to a digital broadcasting system, and more particularly, to an equalizer for equalizing a vestigial side band (VSB) signal in a digital television (TV) system, and an equalizing method thereof.

Broadcasting systems are rapidly changing from analog broadcasting systems to digital broadcasting systems. Traditional analog broadcasting systems are expected to be fully replaced by digital broadcasting systems within the next several years.

Digital broadcasting systems may be classified as European-type and American-type. In Europe, the transmit/receive system of a digital broadcasting signal has been standardized into digital video broadcasting-terrestrial (DVB-T) based on orthogonal frequency division multiplexing (OFDM). In the United States, however, digital broadcasting systems have been standardized based on vestigial side band (VSB). A VSB signal is prescribed in advanced television systems committee (ATSC) standards.

An ATSC 8-VSB digital TV broadcasting system has been designed to account for the use of a roof-top antenna fixed. Accordingly, the ATSC 8-VSB digital TV broadcasting system may be more advantageous for a high-definition (HD) broadcasting compared to the DVB-T standard of Europe, but may be relatively disadvantageous for reception performance in a mobile environment. Several standards (e.g., DVB-H, MediaFLO, T-DMB, ATSC-M/H, and the like) have been proposed as alternatives for providing excellent reception performance in a mobile environment.

The new standards that have been developed as alternatives have contributed to improvement of mobile reception. However, it is generally desirable to modify existing broadcasting equipment and devices to be compatible with the new standards. Accordingly, a significant additional investment may be required to apply the new standards.

An approach for limiting additional investment is to enhance the performance of an ATSC digital TV receiver in a mobile environment. Core technology for enhancing performance of a mobile digital TV receiver includes an equalizer module. The equalizer module can compensate for multi-path channel effects generated in a mobile environment. In order to overcome multi-path effects, the equalizer may adapt a parameter to the fast channel environment at high speed. However, it is known that a receiver of a single carrier communication system, such as 8-VSB scheme, may not be capable of estimating a time-varying channel at high speed.

SUMMARY OF THE INVENTION

Some embodiments of the inventive subject matter provide methods of processing a symbol sequence corresponding to a vestigial side band (VSB) signal. The symbol sequence is divided into a plurality of sections, respective ones of which correspond to respective time periods. Individual ones of the sections are recursively adaptively equalized to produce respective equalized sections. A bit stream is constructed from the equalized sections.

In some embodiments, a first section is recursively adaptively equalized using an equalizer. A state value generated in recursively adaptively equalizing the first section may be used to initialize a recursive adaptive equalization for a second section. The state value may include a state value of a feedback or feedforward delay line of the equalizer. The state value may include a path metric or traceback information of a decision unit of the equalizer.

In some embodiments, the sections may be sequentially processed. The sections may have overlapping symbol periods. In constructing a bit stream from the equalized sections, equalized data corresponding to an overlapping symbol period may be disregarded.

Further embodiments provide an apparatus for processing a symbol sequence corresponding to a vestigial side band (VSB) signal. The apparatus may include a sectioning unit configured to divide the symbol sequence into a plurality of sections, respective ones of which correspond to respective time periods, a recursive adaptive equalizer configured to recursively adaptively equalize individual ones of the sections to produce respective equalized sections and a buffer configured to process the equalized sections to construct a bit stream.

The recursive adaptive equalizer may be configured to recursively adaptively equalize a first section using an equalizer, to store a state value generated in recursively adaptively equalizing the first section and to initialize the recursive adaptive equalizer for equalizing a second section using the stored state value. The state value may include a state value of a feedback or feedforward delay line of the recursive adaptive equalizer. The state value may include a path metric or traceback information of a decision unit of the equalizer.

The sections may have overlapping symbol periods and the buffer may be configured to disregard equalized data corresponding to an overlapping symbol period.

The recursive adaptive equalizer may be driven at a clock frequency that is greater than a symbol processing frequency of the sectioning unit or the output buffer.

In some embodiments, the sectioning unit comprises a first input buffer and a second input buffer alternatively buffering consecutive ones of the sections.

In some embodiments, the recursive adaptive equalizer comprises a feedforward portion configured to the sections, a decision unit configured to generate a data value with reference to an output of the feedforward portion and a feedback portion configured to adjust the output of the feedforward portion with reference to a parameter and the generated data value. The decision unit may include a trellis-coded modulation (TCM) decoder, and a path metric and traceback information of the TCM decoder may be initialized based on an equalizer coefficient generated in equalization of a previously equalized section.

BRIEF DESCRIPTION OF THE DRAWINGS

The accompanying drawings are included to provide a further understanding of the inventive subject matter, and are incorporated in and constitute a part of this specification. The drawings illustrate exemplary embodiments of the inventive subject matter and, together with the description, serve to explain principles of the inventive subject matter. In the drawings:

FIG. 4 is a timing diagram illustrating an operation of a sectioning unit;

DETAILED DESCRIPTION

Figure 9:
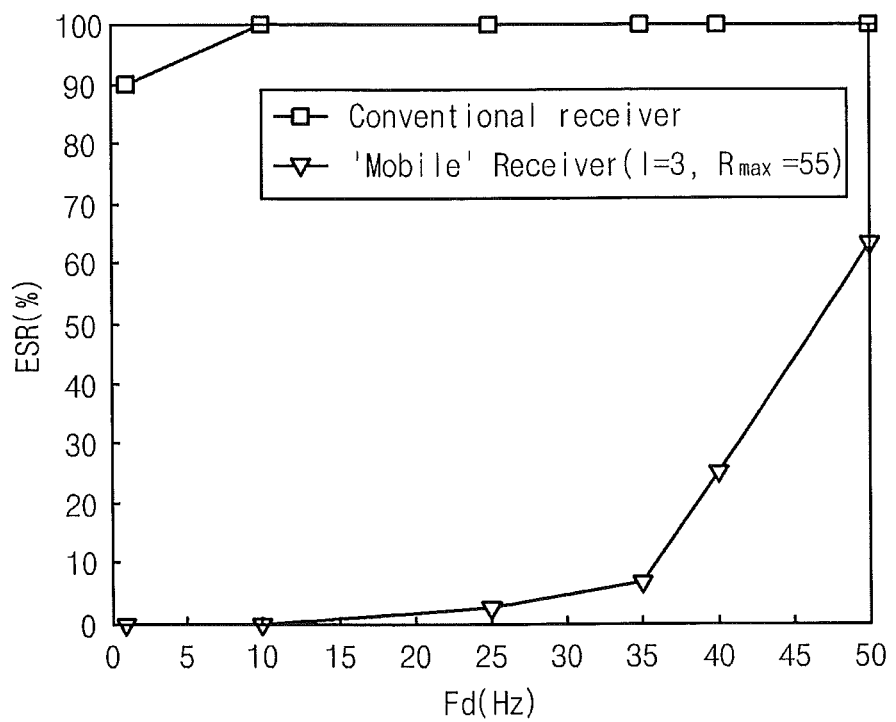
FIG. 9 is a graph illustrating an effect of some embodiments of the inventive subject matter.

FIG. 9 is a graph illustrating an effect of some embodiments of the inventive subject matter.

Reference will now be made in detail to exemplary embodiments, examples of which are illustrated in the accompanying drawings. However, exemplary embodiments are not limited to the embodiments illustrated hereinafter, and the embodiments herein are rather introduced to provide easy and complete understanding of the scope and spirit of exemplary embodiments.

It will be understood that when an element, such as a layer, a region, or a substrate, is referred to as being "on," "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of exemplary embodiments.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Below, an ATSC 8-VSB digital TV receiver is used as one example for illustrating characteristics and functions of the inventive subject matter. However, those skilled in the art can easily understand other advantages and performances of the inventive subject matter according to the descriptions. The inventive subject matter may be embodied or applied through other embodiments. Embodiments described in the detailed description may be amended or modified according to viewpoints and applications, not being out of the scope, technical idea and other objects of the inventive subject matter. Hereinafter, exemplary embodiments of the inventive subject matter will be described in detail with reference to the accompanying drawings.

The present disclosure provides an equalizer and an equalizing method thereof, which can estimate a change of a channel at a high speed in a time-varying channel.

Embodiments of the inventive subject matter provide methods for receiving a vestigial side band (VSB) signal including: dividing a received symbol sequence into a plurality of section; sequentially performing an adaptation equalization operation at least two times with respect to the plurality of divided sections, respectively; and reconstructing a bit stream by connecting filtered sections through the adaptation equalization operation.

In some embodiments, the method may further include backing up an initial state value of an equalizer with respect to a currently-processed section before the adaptation equalization operation is performed.

In other embodiments, the method may further include backing up the initial state value generated by the currently-processed section after the adaptation equalization operation is performed.

In still other embodiments, the initial state value may include a state of a feedback or feedforward delay line of the equalizer.

In even other embodiments, the initial state value may further include a path metric or traceback information of a decision unit included in the equalizer.

In yet other embodiments, the plurality of divided sections may be consecutively provided for the adaptation equalization operation, respectively.

In further embodiments, the plurality of divided sections may be divided to have a symbol region overlapping each other, respectively.

In still further embodiments, the reconstructing of the bit stream may include removing the symbol region overlapping each other.

In even further embodiments, in the performing of the adaptation equalization operation, equalizer coefficients may be expressed as a tap coefficient average ($\alpha$) and a tap varying gradient ($\beta$).

In yet further embodiments, the tap varying gradient ($\beta$) may be set to 0 in the initial adaptation equalization operation with respect to one section.

In other embodiments of the inventive subject matter, receivers for receiving a vestigial side band (VSB) signal include: a sectioning unit dividing a consecutive symbol sequence into a plurality of sections; a recursive equalizer performing an equalizer coefficient adaptation operation at least two times with respect to the plurality of sections; and an output buffer generating a consecutive symbol sequence by rearranging an equalizer output from the recursive equalizer.

In some embodiments, the sectioning unit may divide the symbol sequence such that the plurality of sections include a mutually-overlapping sample region, respectively.

In other embodiments, the output buffer may generate the symbol sequence by removing a symbol sequence corresponding to the overlapping sample region from the equalizer output.

In still other embodiments, the recursive equalizer may be driven at a clock frequency higher than a frequency of a symbol clock for driving the sectioning unit or the output buffer.

In even other embodiments, the recursive equalizer may back up an initial state value of the recursive equalizer upon equalizer coefficient adaptation operation with respect to each of the sections.

In yet other embodiments, the sectioning unit may include a first input buffer and a second input buffer for buffering each of the sections.

In further embodiments, the recursive equalizer may include: a feedforward portion filtering each of the sections; a decision unit deciding data with reference to an output of the feedforward portion; and a feedback portion adjusting the output of the feedforward portion with reference to a parameter and a decision value of the decision unit.

In still further embodiments, the decision unit may include a trellis-coded modulation (TCM) decoder, and a path metric and traceback information of the TCM decoder are backed up upon recursive equalizer coefficient adaptation operation with respect to each of the sections.

Figure 1:
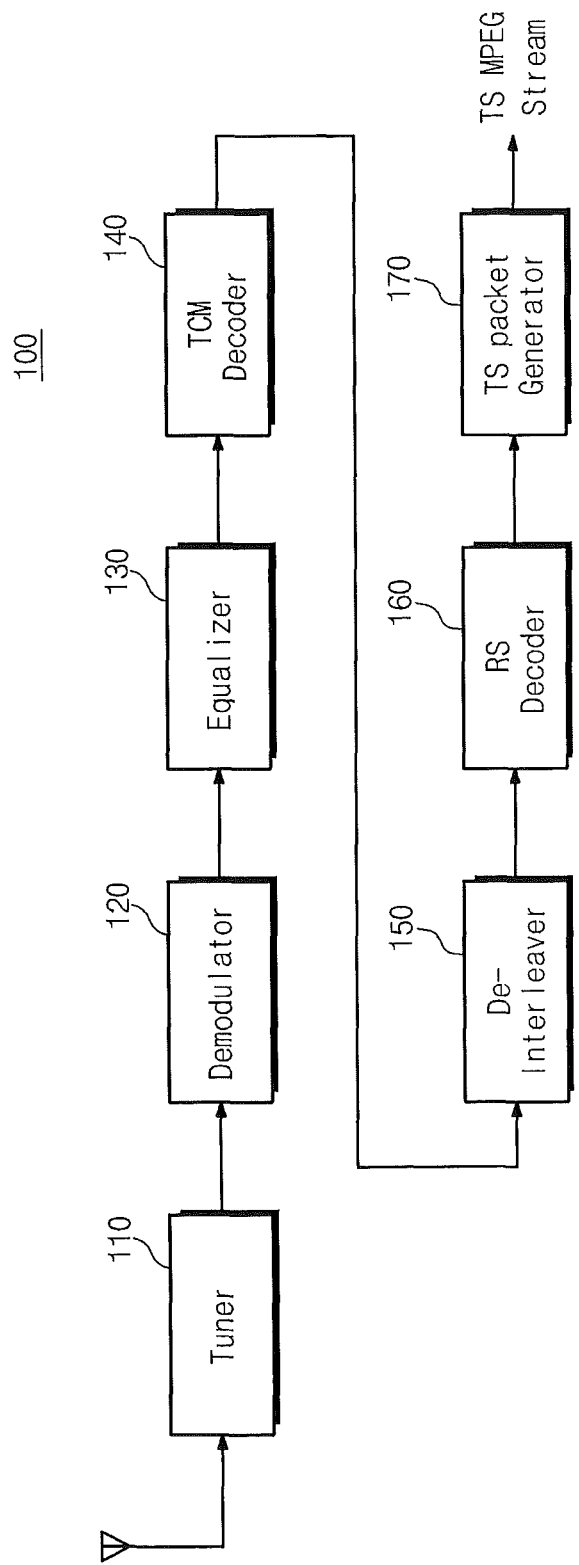
FIG. 1 is a block diagram illustrating a receiver according to some embodiments of the inventive subject matter.

FIG. 1 is a block diagram illustrating a structure of a digital TV receiver according to some embodiments of the inventive subject matter. Referring to FIG. 1, the digital TV receiver 100 may include a tuner 110, a demodulator 120, an equalizer 130, a trellis-coded modulation (TCM) decoder 140, a de-interleaver 150, an RS decoder 160, and a TS packet generator 170.

The tuner 110 may down-convert an RF signal of a carrier frequency via an antenna into a base band or a mid-frequency band. When mixed with an oscillating frequency generated by a local oscillator (not shown), the RF signal of the carrier band may be down converted into the baseband or the mid-frequency band. The received RF signal may be a VSB signal modulated using a signal carrier modulation method. The tuner 110 may change a received signal of a selected band into a fixed intermediate frequency (IF) signal, and provide the fixed intermediate frequency signal to the demodulator 120.

The demodulator 120 may convert the VSB signal down-converted into the mid-frequency band by the tuner 110 into a symbol sequence. For example, the demodulator 120 may include an analog-digital (A/D) converter (not shown) that converts a VSB signal into a digital signal. The demodulator 120 may output the digital signal with symbols (or bit stream) corresponding to a channel modulation method of a transmitter (not shown).

The equalizer 130 may divide the bit stream output from the demodulator 120 into a plurality of sections. The equalizer 130 may perform respective high-speed equalizer coefficient adaptation operations on the respective sections. In some embodiments, the equalizer 130 may execute at least two coefficient updates on the respective sections. If the length of the section is not so short that the convergence of the equalizer coefficient is impossible, and the initial value of the equalizer coefficient with respect to each section does not considerably deviate from the optimal value of the equalizer coefficient, the equalizer coefficient may converge to an optimal (or near-optimal) value according to the equalizer coefficient adaptation operation with respect to the divided sections.

The length of the section divided by the equalizer 130 may be set within a range in which the characteristics of the channel are not significantly changed during the recursive coefficient update operation. Despite a time-varying condition, the response characteristics of the channel may be considered to be constant for a time corresponding to the section. Accordingly, the convergence to the optimal equalizer coefficient can be realized through the recursive adaptation operation with respect to the section divided by the equalizer 130.

The TCM decoder 140 may decode an equalized output from the equalizer 130 according to a trellis code demodulation algorithm that has an error correcting capability. The TCM decoder 140 may perform the trellis decoding operation in a decoding depth on an input symbol. When the decoding depth is great, the size of trace-back may increase, resulting in an accurate decision data value.

The de-interleaver 150 may receive the output of the TCM decoder 140 and arrange it in reverse order of an interleaving performed at the transmitter. A convolutional code applied to the Viterbi algorithm may have a higher error correcting capability when errors are scattered. However, the restoration of data may be difficult when errors are clustered in a specific symbol or data set because of the characteristics of the channel. For example, when a burst error is generated, errors may be concentrated in a specific data field. Such error may be difficult to correct.

Accordingly, the transmitter (not shown) uses interleaving to compensate for burst errors generated on a channel such that they become scattered around a symbol or data sequence. In a receiver, an interleaved symbol sequence is restored in the TCM decoder 140. The de-interleaver 150 may rearrange the interleaved data in the transmitter with respect to the output of the TCM decoder 140. The data rearranged by the de-interleaver 150 may have a scattered error pattern, even if the errors arise from a burst error.

The RS decoder 160 may correct an error regarding data de-interleaved by a reed-Solomon code method. Generally, although it is uncorrectable, it has been known that the packet error can be detected by a long RS decoder. In an Advanced Television Systems Committee (ATSC) VSB transmission system, an RS (207, 187, t=10) decoder may be used. That is, the size of a data block may be about 187 bites, and about 20 RS additional bites may be added for error correction. One RS block of about 207 bites may be transmitted per data segment.

The TS packet generator 170 may generate a TS MPEG stream using the decoded symbol sequence. The digital TV receiver 100 according to some embodiments of the inventive subject matter may include an equalizer 130 that performs recursive equalizer coefficient updates with respect to a provided section unit. The equalizer 130 may divide a received symbol sequence into sections, and may perform update operations as many as a multiple frequency with respect to the divided sections. A section filtered by a finally updated equalizer coefficient may be then be output and, when the output sections are rearranged, a decoded symbol sequence having high accuracy may be obtained.

Figure 2:
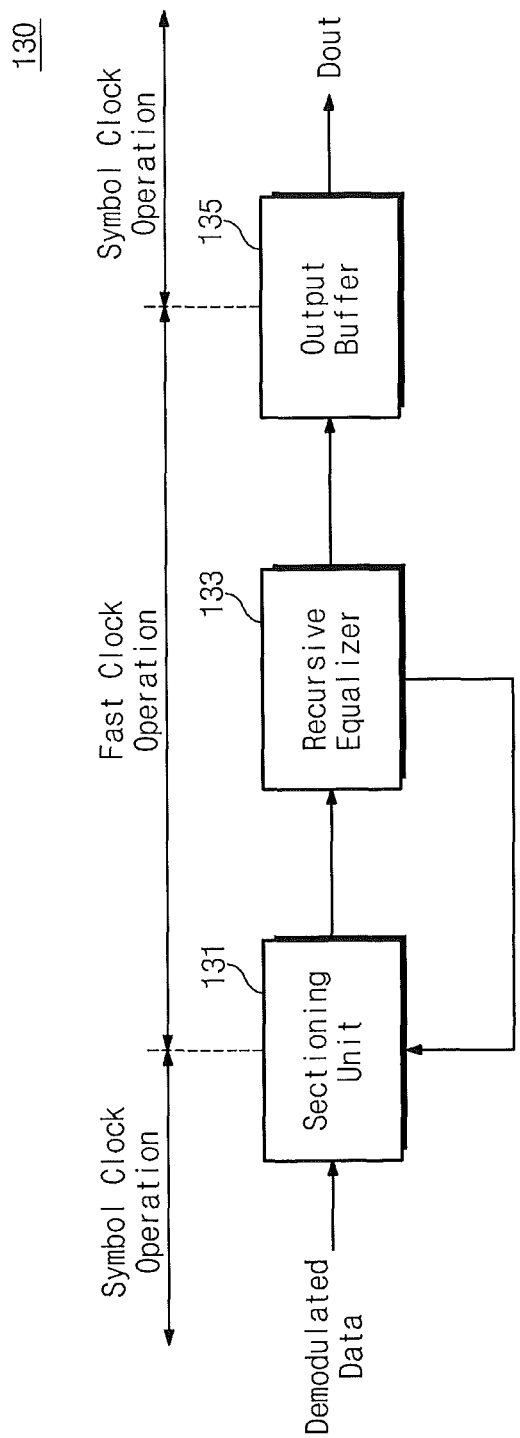
FIG. 2 is a block diagram illustrating a recursive equalizer of the receiver of FIG. 1.

FIG. 2 is a block diagram illustrating a structure for the equalizer 130 of FIG. 1 according to some embodiments. Referring to FIG. 2, the equalizer 130 may include a sectioning unit 131, a recursive equalizer 133, and an output buffer 135.

The sectioning unit 131 may divide symbol sequences delivered from the demodulator (120 of FIG. 1) by a specific unit (hereinafter "section"). The respective sections divided by the sectioning unit 131 may be sequentially provided to the recursive equalizer 133. The unit of the divided sections may correspond to a time section in which channel characteristics are maintained constant in a time-varying channel. The sectioning unit 131 may supply the divided sections to the recursive equalizer 133 in response to a control signal received from the recursive equalizer 133.

The recursive equalizer 133 may perform a recursive equalizer coefficient update on the respective sections provided from the sectioning unit 131. For example, the recursive equalizer 133 may repeatedly perform a high-speed coefficient adaptation operation with respect to one section provided from the sectioning unit 131. The number of cycles of the coefficient adaptation operation may be determined according to the clock frequency of the recursive equalizer 133 or the size of the divided section. The recursive equalizer 133 may cause the equalizer coefficient to converge to an optimal (or near optimal) value through the recursive adaptation equalization with the input section. A section filtered by the converged equalizer coefficient may be delivered to the output buffer 135.

The output buffer 135 may rearrange sections filtered and output by the recursive equalizer 133 to output them in a symbol sequence. One section may be generated as an equalizer coefficient that is converged to an optimal value through the recursive adaptation equalization. The section may be filtered by the equalizer coefficient that is converged into the optimal value. The filtered section may be stored in the output buffer 135.

The output buffer 135 may reorganize a plurality of stored sections into consecutive symbol sequences. Particularly, one section may be divided to include portions overlapping adjacent sections in order to increase the accuracy of the channel equalization. In this case, a pre-margin and a post-margin may be removed from each of filtered sections in the output buffer 135. The output buffer 135 may connect the sections from which the pre-margin and the post-margin have been removed, and then output them as a symbol sequence. The components of the equalizer 130 described may be driven by different clock frequencies, that is, the recursive equalizer 133 may perform the recursive adaptation operation until the equalizer coefficient converges to the optimal value with respect to one section provided from the sectioning unit 131. The recursive equalizer 133 may filter a section to which a converged equalizer coefficient value is input, and provide it to the output buffer 135. The recursive coefficient adaptation operation of the recursive equalizer 133 may be performed multiple times while one section is delivered from the sectioning unit 131 to the output buffer 135. Accordingly, the recursive equalizer 133 may be driven at a clock frequency two or more times greater than the symbol frequency.

Figure 3:
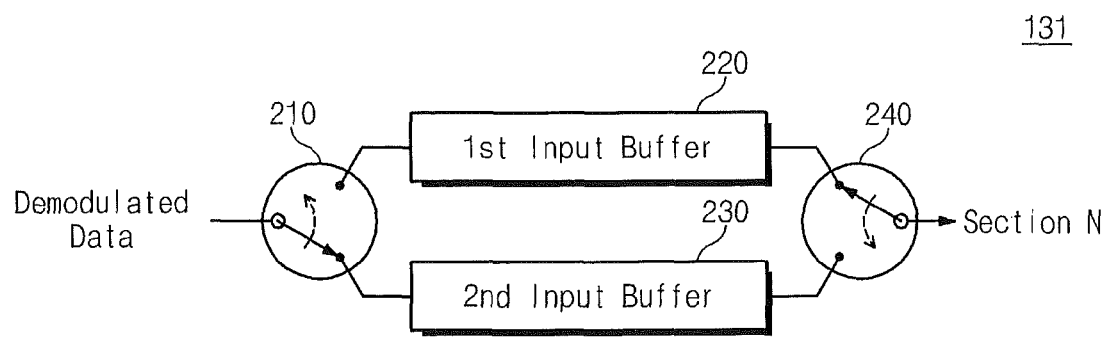
FIG. 3 is a block diagram illustrating a structure of a sectioning unit of FIG. 2.

FIG. 3 is a block diagram illustrating the operating characteristics of a sectioning unit 131 of FIG. 2 according to some embodiments. Referring to FIG. 3, the sectioning unit 131 may include switches 210 and 240, a first input buffer 220, and a second input buffer 230.

A demodulated symbol sequence delivered to the sectioning unit 131 may be synchronized with a symbol clock to be stored in the first input buffer 220 or the second input buffer 230. In this case, each of the switches 210 and 240 may exclusively connect the first input buffer 220 or the second input buffer 230 to an input terminal or an output terminal. For example, while an input symbol sequence is being buffered in the second input buffer 230 as shown in the drawing, the switches 210 and 240 may be controlled such that an already-stored symbol sequence in the first input buffer 220 may be output. Here, the size of the first input buffer 220 and the second input buffer 230 may correspond to a section that becomes a unit of the adaptation equalization operation of the recursive equalizer (133 of FIG. 2).

Next, when the buffering of the second input buffer 230 is complete and the output o the first input buffer 220 is complete, the selection position of the switches 210 and 240 may be reversed. That is, the first switch 210 may change a path such that input symbol sequences are delivered to the first input buffer 220. The second switch 240 may change its output path such that the symbol sequences of the second input buffer 230 that have been buffered are output. The symbol sequence that is demodulated by this method may be continuously input to the sectioning unit 131. The symbol sequence buffered in the sectioning unit 131 may be provided to the recursive equalizer 133 by in second units.

The second switch 240 may alternately switch the first input buffer 220 or the second input buffer 230 to continuously deliver the sections to the recursive equalizer 133. However, the sectioning unit 131 may include symbols overlapping other sections adjacent to the former and latter portions of the section in order to enhance the accuracy of the filtering operation of the recursive equalizer 133. For overlapping of the sections, the switching timing of the first and second switches 210 and 240 may be appropriately controlled. An example of this type of sectioning will be described in more detail with reference to FIG. 4B.

FIGS. 4A and 4B are timing diagrams illustrating an operation of the sectioning unit 131 according to further embodiments. FIG. 4A illustrates that sections divided by the sectioning unit 131 are continuously provided to the recursive equalizer 133 without overlapping one another. FIG. 4B illustrates that the sections are divided by the sectioning unit 131 to include portions overlapping adjacent sections.

Referring to FIG. 4A, the sectioning unit 131 may sequentially buffer symbol sequences provided from the demodulator (120 of FIG. 1). The sectioning unit 131 may continuously output the sections stored in the first and second input buffers 220 and 230. Each of the continuously-output sections may be used in multiple equalizer coefficient updates by the recursive equalizer 133. When the update of the equalizer coefficient is completed with respect to one section in the recursive equalizer 133, the section unit 131 may provide consecutive sections to the recursive equalizer 133.

FIG. 4B is a timing diagram illustrating a section configuration by the sectioning unit 131 according to other embodiments of the inventive subject matter. Referring to FIG. 4B, the former and latter portions of each section may include a pre-margin and a post-margin. Symbols corresponding to the pre-margin and the post-margin may be overlapping portions of adjacent sections. In an adaptation algorithm for channel equalization, the accuracy of data may be reduced in the former and latter portion of the section. Accordingly, although the equalizer coefficient has been converged by the recursive equalizer 133, only portions having high accuracy may be taken from each of sections filtered according to the converged equalizer coefficient. Thus, an error included in a bit stream may be further reduced.

Figure 5:
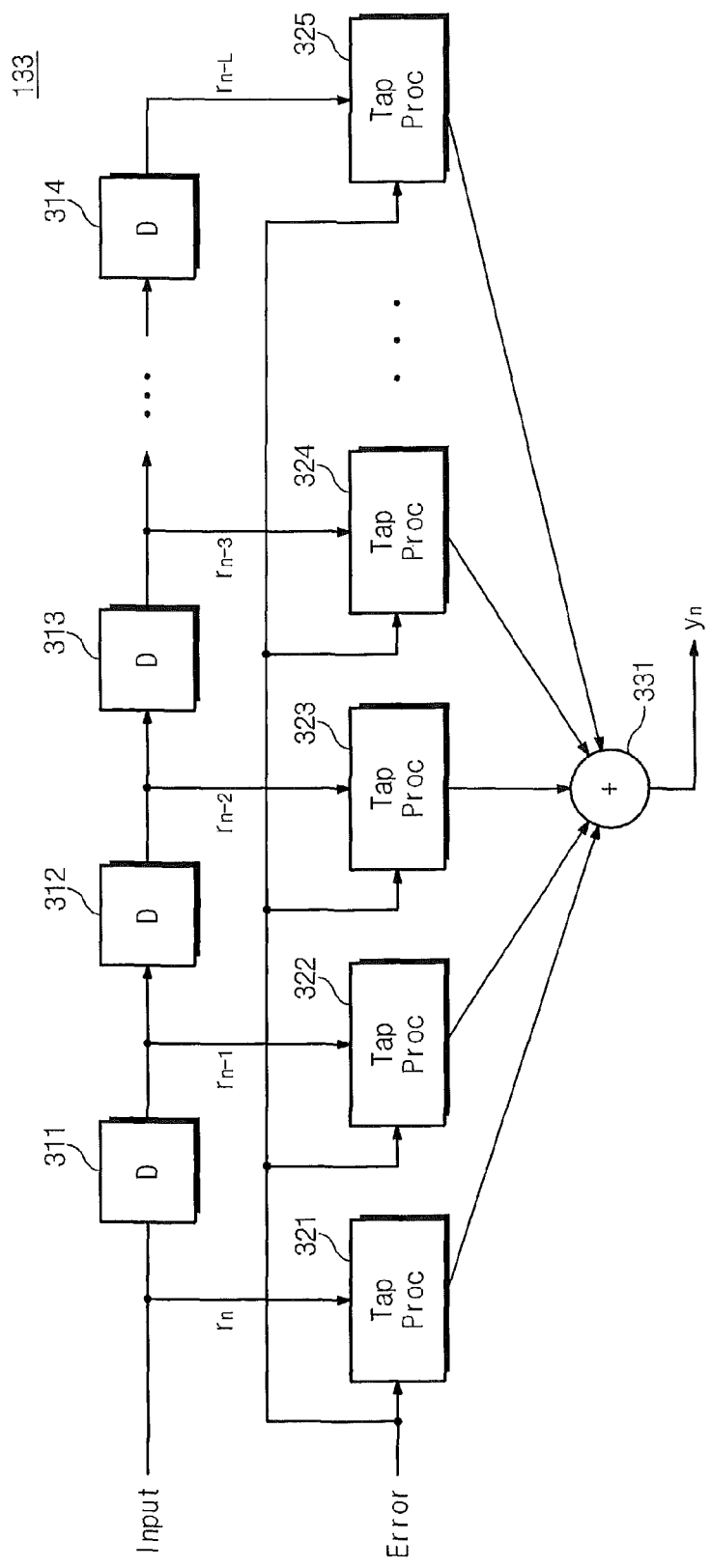
FIG. 5 is a block diagram illustrating a structure of a recursive equalizer.

FIG. 5 is a block diagram illustrating an adaptation process of the recursive equalizer 133 of FIG. 2 according to some embodiments. Referring to FIG. 5, the recursive equalizer 133 may include a plurality of delay taps 311, 312, . . . , 314, and a plurality of tap processors 321, 322, . . . , 325, and an adder 331. That is, the recursive equalizer 133 may be configured with a form of adaptive transversal filter.

When one section is provided from the sectioning unit (131 of FIG. 2), samples included in the section may be sequentially shifted by the delay taps 311, 312, . . . , 314. The respective samples $r_n, r_{n-1}, r_{n-2}, r_{n-3}, \ldots, r_{n-L}$ (L is the length of a tap delayer line) may be provided to the corresponding tap processors 321, 322, ..., 325. The tap processors 321, 322, ..., 325 may perform an adaptation algorithm on the equalizer coefficients of each samples by referring to an error. The error may be generated with reference to an equalizer output $y_n$ of the recursive equalizer 133.

The equalizer coefficients updated by the tap processors 321, 322, ..., 325 may be applied to each of the samples $r_n$, $r_{n-3}, \ldots, r_{n-L}$ as weight values. The signal applied as weight values by the tap processors 321, 322, ..., 325 may be combined by the adder 331, and may be output as the equalizer output $y_n$.

The equalizer output $y_n$ described above can be expressed as Equation (1).

$$y_n = a_n r_n^T, n=0, 1, \ldots, N-1$$

$$r_n = [r_n\ r_{n-1} \ldots r_{n-L}]$$

$$a_n = [a_0\ a_1 \ldots a_{L-1}] \quad (1)$$

where N indicates the length of a sample sequence constituting one section.

The equalizer output $y_n$ with respect to each of samples may be output as the size corresponding to the number of cycles with respect to each of sections. That is, the respective sections may repeatedly output the equalizer output $y_n$ until the equalizer coefficient is converged.

Although the recursive equalizer 133 described in FIG. 5 has been described about only a feedforward part, embodiments of the inventive subject matter is not limited thereto. The recursive equalizer 133 may include a feedforward part and a feedback part. In a digital TV receiver, the feedforward part may serve to remove an influence of a pre-ghost during inter-symbol interference (ISI) included in a received symbol. The feedback part of the recursive equalizer 133 may generate an error using a traceback data or a path metric and a decision value from a decision unit (e.g., TCM decoder). Accordingly, the configuration of the recursive equalizer 133 of FIG. 5 may be applied to both of the feedforward part and the feedback part.

Figure 6:
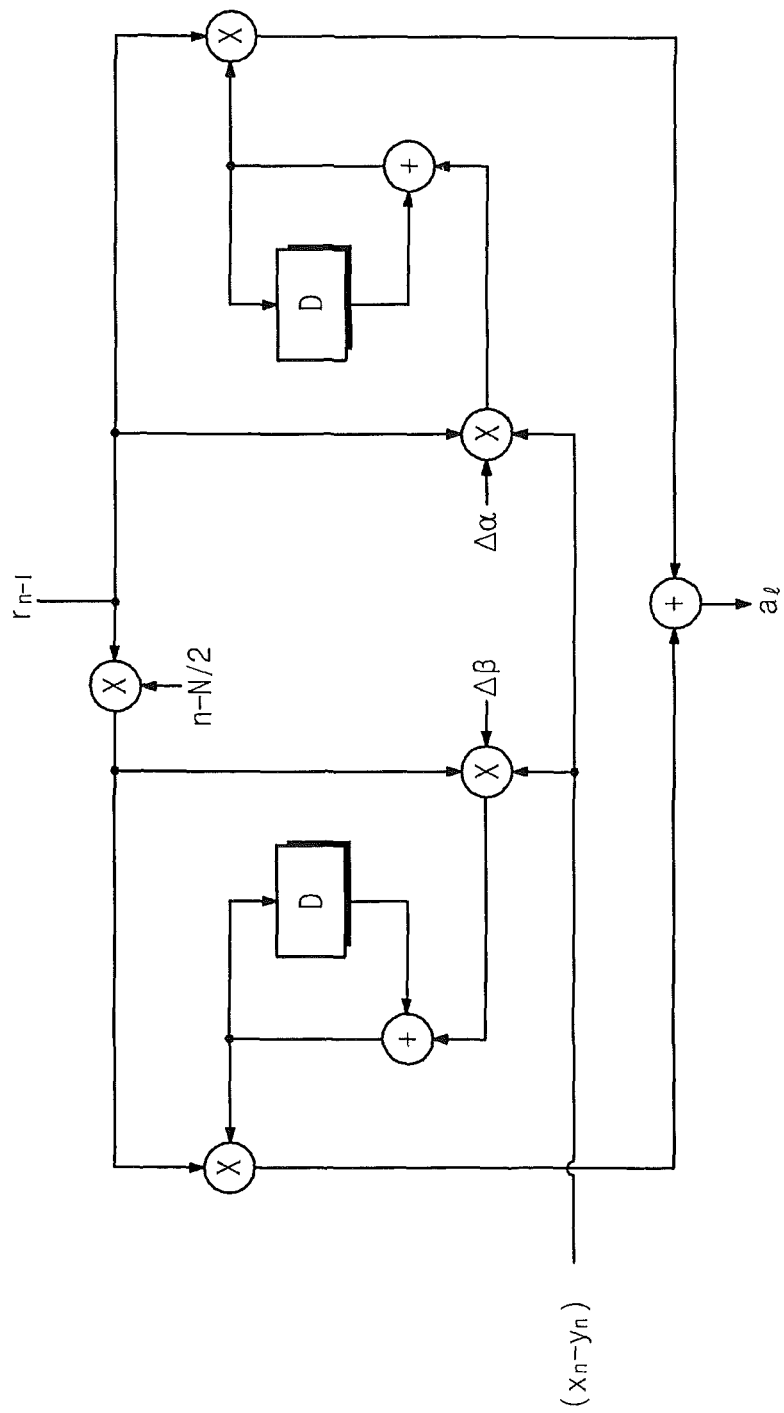
FIG. 6 is a block diagram illustrating a structure of a tap processor of FIG. 5.

FIG. 6 is a block diagram illustrating the structure for the tap processors of FIG. 5 according to some embodiments. Referring to FIG. 6, an adaptation algorithm corresponding to the first sample of the tap processors 321, 322, ..., 325 is shown. Here, an equalizer coefficient a1 may be modeled as including two linear time-varying coefficients.

As shown in the drawing, an equalizer coefficient that is output according to an algorithm procedure regarding a sample rn−1 can be modeled as Equation (2) below.

$$a_l = \alpha_l + \left(n - \frac{N}{2}\right)\beta_l \quad (2)$$

where $a_1$ is an average of equalizer coefficients, and $\beta_1$ is a time-varying gradient parameter.

It will be assumed that the equalizer coefficient $\alpha_1$ may be linearly changed upon operation with respect to one section including N samples. Accordingly, estimation of a gradient parameter $\beta$ may be required on each of the equalizer coefficients.

In order to update the above-described equalizer coefficient according to a least mean square (LMS) algorithm, a steepest-decent algorithm may be used. In this case, an algorithm of Equation (3) below may be applied for fast convergence of the equalizer coefficient.

$$a^{(n+1)} = a^{(n)} - \frac{1}{2}\Delta g^{(n)} \quad (3)$$

$$g = \frac{\partial J(a)}{\partial a}$$

where $\Delta$ is a step size, and j(a) is a cost function.

The cost function J(a) can be expressed as Equation (4).

$$J(a) = E[|x_n - y_n|^2] = E\left[\left|x_n - \alpha r_n^T - \left(n - \frac{N}{2}\right)\beta r_n^T\right|^2\right] \quad (4)$$

where $x_n$ is an estimated value of a reference symbol.

If a partial differential of the cost function shown in Equation (4) is taken, it can be expressed as Equation (5).

$$\frac{\partial E\left[\left|x_n - \alpha r_n^T - \left(n - \frac{N}{2}\right)\beta r_n^T\right|^2\right]}{\partial \alpha_l} = \frac{E\left[2\alpha_l r_{n-l}\left(\alpha r_n^T + \left(n - \frac{N}{2}\right)\beta r_n^T - x_n\right)\right]}{\partial \alpha_l}$$

$$= E\left[2r_{n-l}\left(\alpha r_n^T + \left(n - \frac{N}{2}\right)\beta r_n^T - x_n\right)\right]$$

$$\frac{\partial E\left[\left|x_n - \alpha r_n^T - \left(n - \frac{N}{2}\right)\beta r_n^T\right|^2\right]}{\partial \beta_l} = \frac{E\left[\begin{array}{c}2\left(n - \frac{N}{2}\right)\beta_l r_{n-l} \\ \left(\alpha r_n^T - \left(n - \frac{N}{2}\right)\beta r_n^T - x_n\right)\end{array}\right]}{\partial \beta_l}$$

$$= E\left[2\left(n - \frac{N}{2}\right)r_{n-l}\left(\alpha r_n^T - \left(n - \frac{N}{2}\right)\beta r_n^T - x_n\right)\right]$$

In the LMS algorithm, convergence into a target equalizer coefficient is possible by replacing an expected value with an instantaneous value. In order to implement the minimum value of the partial differential shown in Equation (5), Equation (6) may be derived as follows.

$$\alpha_l^{(n-1)} = \alpha_l^{(n)} + \Delta r_{n-l}(x_n - y_n) \quad (6)$$

$$\beta_l^{(n-1)} = \beta_l^{(n)} + \Delta r_{n-l}\left(n - \frac{N}{2}\right)(x_n - y_n)$$

On the assumption that time-varying characteristic with respect to one section is not great, it may be intuitively expected that β has a relatively small value. When β is 0 at the initial operation, an optimal vector sequence α can be obtained, but mutually-improved α and β can be thereafter obtained by Equation (6). Equation (7) below shows that different step sizes can be used to obtain α and β.

$$\alpha_l^{(n-1)} = \alpha_l^{(n)} + \Delta_\alpha r_{n-l}(x_n - y_n) \quad (7)$$

$$\beta_l^{(n-1)} = \beta_l^{(n)} + \Delta_\beta r_{n-l}\left(n - \frac{N}{2}\right)(x_n - y_n)$$

Here, when $\Delta\beta \ll \Delta\alpha$ and β=0 in an initial adaptation operation, it can be understood that an equalizer coefficient can be converged through a recursive equalizer adaptation operation. An adaptation algorithm according to some embodiments is shown in FIG. 6.

Figure 7B:
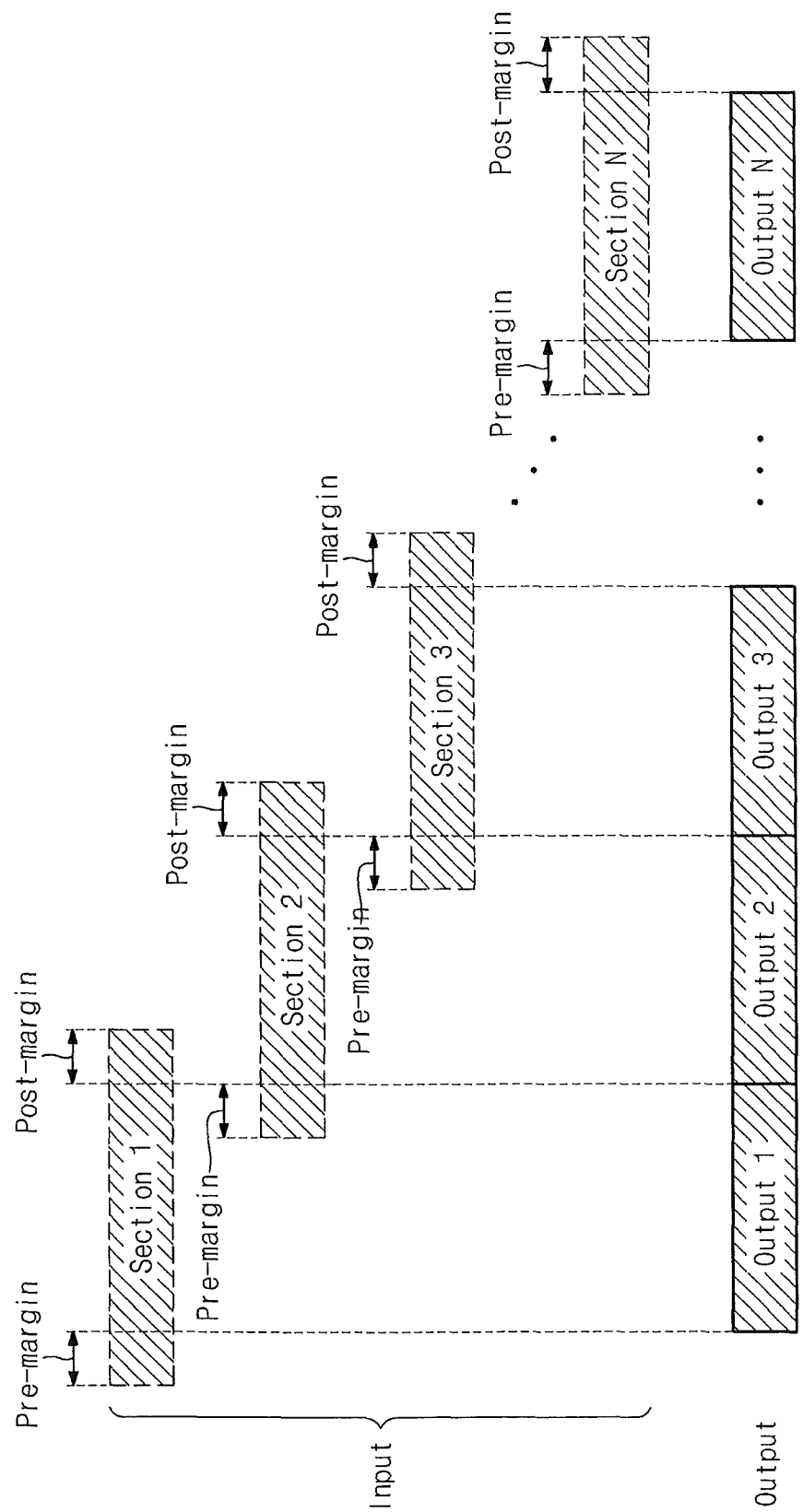
FIG. 7 is a timing diagram illustrating an operation of an output buffer of FIG. 2.

FIGS. 7A and 7B are timing diagrams illustrating an exemplary operation of the output buffer 135 of FIG. 2. FIG. 7A illustrates some embodiments in which there is no margin interval with respect to sections. FIG. 7B illustrates some embodiments in which a margin interval is set with respect to the sections.

Referring to FIG. 7A, the output buffer 135 may sequentially output the sections 1, 2, . . . , N delivered from the recursive equalizer 133. When there is no margin with respect to each of sections, the output buffer 135 may serve as a first input first output (FIFO) buffer.

Referring to FIG. 7B, the output buffer 135 may remove a pre-margin and a post-margin in the former and latter portions of the sections, respectively. The sections from which the pre-margin and the post-margin are removed may be rearranged to the continuity of time. The sections that are rearranged by the output buffer 135 may be again output as a consecutive symbol sequence. In the adaptation algorithm for channel equalization, the accuracy of data may be reduced in the former and latter portions of the section. Accordingly, although the equalizer coefficient is converged by the recursive equalizer 133, only portions having high accuracy are taken from the respective sections to further reduce an error.

Figure 8:
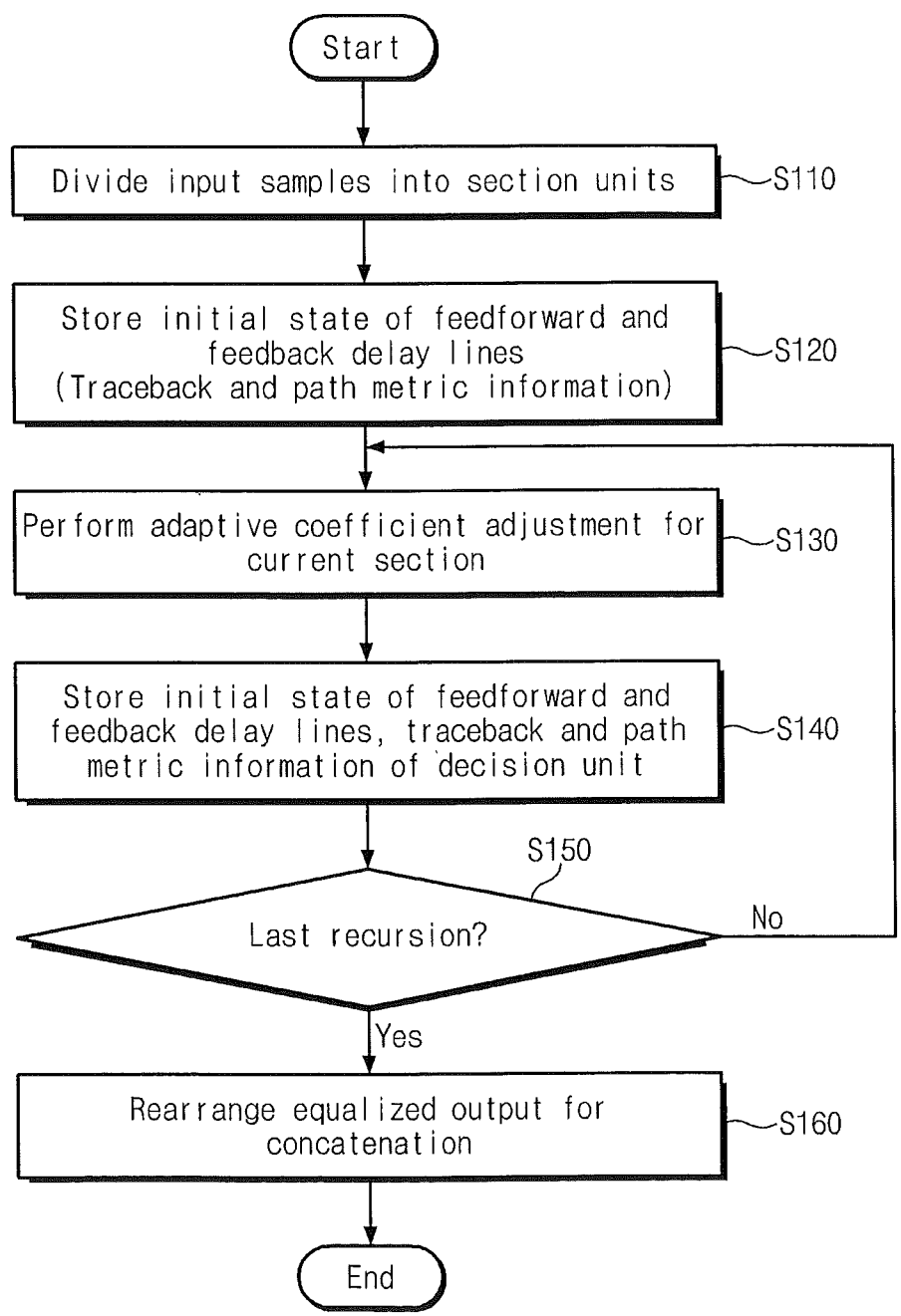
FIG. 8 is a flowchart illustrating update operations of an adapt equalizer according to some embodiments of the inventive subject matter.

FIG. 8 is a flowchart illustrating channel equalizing operations according to some embodiments of the inventive subject matter. Referring to FIG. 8, a recursive equalization procedure with one section will be described.

In operation 5110, if symbol sequences are provided from the demodulator (120 of FIG. 1), the sectioning unit 131 (131 of FIG. 2) may select data by section units for recursive equalization. A selected section may be stored in one of input buffers 220 and 230. The section stored in the input buffers 220 and 230 may be delivered to the recursive equalizer 133 for the recursive equalization. However, a consecutive section may be stored in another input buffer when data stored in the input buffer is delivered to the recursive equalizer 133.

In operation 5120, when one section is input to a feedforward or feedback delay line, an initial value on the feedforward or feedback delayer line may be stored in a prepared memory. However, the initial values of equalizer coefficients need not to be stored. Also, when a TCM decoder is used as a decision unit (e.g., a simplified decoder provided in the equalizer), the initial state values (path metric and traceback information) of the TCM decoder may be backed up.

In operation 5130, a recursive update may be performed on an equalizer coefficient with respect to the selected section. The recursive equalizer (133 of FIG. 2) may execute a high-speed equalizer coefficient update with respect to one section that is provided. The driving clock frequency of the recursive equalizer 133 may be higher than the frequency of the symbol clock storing the sample sequences. That is, the update of the equalizer coefficient may be performed with a frequency n (n is an integer) times higher than the frequency of the symbol clock driving the sectioning unit 131. In the update of the equalizer coefficient, the clock frequency of the recursive equalizer 133 may vary according to the length of the section and the state of the channel.

In operation 5140, when a one update of the equalizer coefficient is completed, the state of the recursive equalizer 133 may be stored. Also, the initial state values (path metric and traceback information) of the decision unit (e.g., TCM decoder) may be stored.

In operation 5150, it is determined whether the update of the equalizer coefficient with respect to the selected section is a final update. If the performed update of the equalizer coefficient is not final, the procedure proceeds to operation 5130. However, when the performed update of the equalizer coefficient is the final update with respect to the selected section, the procedure proceeds to operation 5160.

In operation S160, the output buffer 135 may output a section filtered by the equalizer coefficient finally updated by the recursive equalizer 133. If the sections are divided to overlap adjacent sections, the overlapping portions of the section may be removed in the output buffer 135, and the remainder of section may be output. However, if the sections are output without overlapping, equalized output may be rearranged to be consecutive to an adjacent section. The rearranged filtered sections may constitute a decoded symbol sequence.

FIG. 9 is a graph illustrating an effect according to some embodiments of the inventive subject matter. Referring to FIG. 9, ESR, one of more exact performance indicators, is shown with respect to a receiver according to some embodiments of the inventive subject matter compared to a typical receiver.

A time error rate of a MPEG-TS stream packet that is received for a second at the maximum Doppler frequencies (e.g., about 1, 10, 20, 35, 40, and 50 Hz) is shown in a typical mobile channel model (TU6). ESR may indicate rates of seconds including uncorrectable error in MPEG-TS packets received for the total batch time (e.g., 2 minutes). Generally, ESR of about 10% or less may be allowed in a mobile receiver. As shown in the graph, a typical receiver may provide characteristics that are not appropriate even at a low Doppler frequency. On the other hand, the receiver using a recursive equalization technique according to some embodiments of the inventive subject matter may provide a relatively low ESR even at a Doppler frequency of about 35 Hz or more.

According to some embodiments of the inventive subject matter, fast and exact channel estimation is possible even in a time-varying channel. Accordingly, for example, an ATSC digital TV system having excellent receiving performance in a mobile environment can be economically implemented.

The above-disclosed subject matter is to be considered illustrative and not restrictive, and the appended claims are intended to cover all such modifications, enhancements, and other embodiments, which fall within the true spirit and scope of the inventive subject matter. Thus, to the maximum extent allowed by law, the scope of the inventive subject matter is to be determined by the broadest permissible interpretation of the following claims and their equivalents, and shall not be restricted or limited by the foregoing detailed description.

What is claimed is:

1. A method of processing a symbol sequence corresponding to a vestigial side band (VSB) signal, the method comprising:
   dividing the symbol sequence into a plurality of sections, respective ones of which correspond to respective time periods;
   recursively adaptively equalizing individual ones of the sections to produce respective equalized sections at a coefficient update frequency that is greater than a symbol rate of the symbol sequence; and
   constructing a bit stream from the equalized sections,
   wherein recursively adaptively equalizing individual ones of the sections to produce respective equalized sections comprises:
   generating a state value in recursively adaptively equalizing a first section; and
   initializing a recursive adaptive equalization for a second section using the generated state value.

2. The method of claim 1, wherein the state value comprises a state value of a feedback or feedforward delay line of an equalizer.

3. The method of claim 1, wherein the state value comprises a path metric or traceback information of a decision unit of an equalizer.

4. The method of claim 1, wherein recursively adaptively equalizing individual ones of the sections to produce respective equalized sections comprises sequentially processing the sections.

5. The method of claim 1, wherein the sections have overlapping symbol periods.

6. The method of claim 5, wherein constructing a bit stream from the equalized sections comprises disregarding equalized data corresponding to an overlapping symbol period.

7. The method of claim 1, wherein recursively adaptively equalizing individual ones of the sections to produce respective equalized sections comprises initializing a tap variation gradient to zero.

8. The method of claim 1, wherein respective ones of the sections comprise respective groups of symbols.

9. An apparatus for processing a symbol sequence corresponding to a vestigial side band (VSB) signal, the apparatus comprising:
  a sectioning circuit configured to divide the symbol sequence into a plurality of sections, respective ones of which correspond to respective time periods;
  a recursive adaptive equalizer configured to recursively adaptively equalize individual ones of the sections to produce respective equalized sections; and
  a buffer configured to process the equalized sections to construct a bit stream,
  wherein the recursive adaptive equalizer is driven at a clock frequency that is greater than a symbol processing frequency of the sectioning circuit or the buffer,
  wherein the recursive adaptive equalizer is configured to generate a state value in recursively adaptively equalizing a first section and to initialize the recursive adaptive equalizer for equalizing a second section using the generated state value.

10. The apparatus of claim 9, wherein the state value comprises a state value of a feedback or feedforward delay line of the recursive adaptive equalizer.

11. The apparatus of receiver of claim 10, wherein the recursive adaptive equalizer comprises:
  a feedforward portion configured to filter the sections;
  a decision unit configured to generate a data value with reference to an output of the feedforward portion; and
  a feedback portion configured to adjust the output of the feedforward portion with reference to a parameter and the generated data value.

12. The apparatus of claim 11, wherein the decision unit comprises a trellis-coded modulation (TCM) decoder, and wherein a path metric and traceback information of the TCM decoder are initialized based on an equalizer coefficient generated in equalization of a previously equalized section.

13. The apparatus of claim 9, wherein the state value comprises a path metric or traceback information of a decision unit of the recursive adaptive equalizer.

14. The apparatus of claim 9, wherein the recursive adaptive equalizer is configured to sequentially processing the sections.

15. The apparatus of claim 9, wherein the sections have overlapping symbol periods.

16. The apparatus of claim 15, wherein the buffer is configured to disregard equalized data corresponding to an overlapping symbol period.

17. The apparatus of claim 9, wherein the sectioning circuit comprises a first input buffer and a second input buffer alternatively buffering consecutive ones of the sections.

18. The apparatus of claim 9, wherein respective ones of the sections comprise respective groups of symbols.

19. A method of processing a symbol sequence corresponding to a vestigial side band (VSB) signal, the method comprising:
  converting VSB signal into the symbol sequence;
  dividing the symbol sequence into a plurality of sections including a first section, a second section and a third section;
  recursively adaptively equalizing the first section, the second section and the third section;
  decoding the equalized first section, the equalized second section and the equalized third section;
  arranging the decoded first section, the decoded second section and the decoded third section,
  wherein the first section, the second section and the third section are consecutive;
  wherein the first section ends with a first margin symbol, the second section begins with a second margin symbol and ends with a third margin symbol, and third section begins with a fourth margin symbol; and
  wherein the first margin symbol and the second margin symbol include an overlapping portion and the third margin symbol and the fourth margin symbol include an overlapping portion.

* * * * *